(12) United States Patent
Gotsmann et al.

(10) Patent No.: US 7,522,511 B2
(45) Date of Patent: Apr. 21, 2009

(54) METHOD FOR MECHANICAL DATA STORAGE DEVICE OPERATION AND CONTROL

(75) Inventors: Bernd W. Gotsmann, Horgen (CH); Urs T. Duerig, Rueschlikon (CH); Charalamoos Pozidie, Gattikon (CH); Hugo E. Rothuizen, Adliwail (CH); Gerd K. Binnig, Wollerau (CH)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 11/158,844

(22) Filed: Jun. 22, 2005

(65) Prior Publication Data

US 2005/0281174 A1 Dec. 22, 2005

(51) Int. Cl.
*G11B 9/00* (2006.01)
*G11B 9/10* (2006.01)
(52) U.S. Cl. ...................... 369/126; 369/101
(58) Field of Classification Search ............... 369/101, 369/126, 275
See application file for complete search history.

(56) References Cited

U.S. PATENT DOCUMENTS 4,343,993 A 8/1982 Binnig et al.
5,461,605 A * 10/1995 Takimoto et al. ............ 369/126
5,751,686 A * 5/1998 Kuroda et al. ............... 369/126
6,297,502 B1 * 10/2001 Jarvis et al. ................. 250/307
6,884,999 B1 * 4/2005 Yedur et al. ................. 250/306
7,394,749 B2 * 7/2008 Binnig et al. ............... 369/126
2008/0225676 A1 * 9/2008 Gotsman et al. ............ 369/126

FOREIGN PATENT DOCUMENTS

EP 0 233 918 6/1987
WO WO 02/061734 8/2002

OTHER PUBLICATIONS

"The millipede—more than 1,000 tips for future AFM data storage" by P. Vettiger et al., IBM Journal Research Development, vol. 44, No. 3, Mar. 2000.

* cited by examiner

*Primary Examiner*—Hoa T Nguyen
*Assistant Examiner*—Mark Fischer
(74) *Attorney, Agent, or Firm*—Vazken Alexanian

(57) ABSTRACT

The present invention provides data storage devices, systems and methods. An example device includes: a storage medium for storing data in the form of marks; and at least one probe. The probe(s) and storage medium are operable to move relative to each other, with each probe comprising a tip facing the storage medium and having a force creating unit associated thereto. The force creating units are operable to create a force acting between the tip and said storage medium. The data storage device is operable to erase an indentation mark in the storage medium by way of controlling the force creating unit for creating at least one erase force pulse with a force rise time being less than or equal to the order of 1 microsecond.

1 Claim, 2 Drawing Sheets

METHOD FOR MECHANICAL DATA STORAGE DEVICE OPERATION AND CONTROL

TECHNICAL FIELD

The present invention relates to a data storage device and a method for operating a data storage device.

BACKGROUND OF THE INVENTION

Techniques that use sharp tips, with apex dimensions on the nanometer-scale, for imaging and investigating the structure of materials down to the atomic scale, are known. Such techniques include atomic force microscopy (AFM) and scanning tunneling microscopy (STM), as disclosed in EP 0 223 918 B1 and U.S. Pat. No. 4,343,993.

Based on the developments in scanning tunneling microscopy and atomic force microscopy, new storage concepts have been introduced over the past few years that profit from these technologies. Probes having a nanoscale-sized tip have been introduced for modifying the topography and for scanning an appropriate storage medium. Data are written as sequences of bits represented by topographical marks, such as indentation marks and non-indentation marks. The tips comprise apexes with a radius in the lower nanometer range and the indentation marks have, for example, a diameter in the range of 20 to 40 nm. Hence, these data storage concepts promise ultra-high storage area density.

A storage device for storing data based on the AFM principle is disclosed in "The millipede—more than 1,000 tips for future AFM data storage" by P. Vettiger et al., IBM Journal Research Development, Vol. 44, No. 3, March 2000. The storage device has a read and write function based on a mechanical x-, y-scanning of a storage medium with an array of probes each having a tip. The probes operate in parallel, each probe scanning, during operation, an associated field of the storage medium. In this way, high data rates may be achieved. The storage medium may comprise a thin polymethylmethacrylate (PMMA) layer. The tips are moved across the surface of the polymer layer in a contact mode. The contact mode is achieved by applying small forces to the probes so that the tips of the probes can touch the surface of the storage medium. For that purpose, the probes comprise cantilevers carrying sharp tips on their end sections. Bits are represented by indentation marks or non-indentation marks in the polymer layer. The cantilevers respond to these topographic changes in the surface while they are moved across the surface. Indentation marks are formed on the polymer surface by thermomechanical recording. This is achieved by heating a respective probe with a current or voltage pulse during the contact mode in a way that the polymer layer is softened locally where the tip touches the polymer layer. The result is a small indentation on the layer having a nanoscale diameter.

Reading is also accomplished by a thermomechanical concept. The heater cantilever is supplied with an amount of electrical energy, which causes the probe to heat up to a temperature that is not high enough to soften the polymer layer as is necessary for writing. The thermal sensing is based on the fact that the thermal conductance between the probe and the storage medium, especially a substrate on the storage medium, changes when the probe is moving in an indentation as the heat transport is in this case more efficient. As a consequence of this, the temperature of the cantilever decreases and hence, also its electrical resistance changes. This change of electrical resistance is then measured and serves as the measuring signal.

WO 02/061734 discloses a data storage device with a storage medium in the form of a polymer layer and a cantilever comprising a tip with a nanoscale apex being located in close contact with the storage medium. The data storage device is designed to write data to the storage medium by a combination of applying a local force to the polymer layer via the tip and applying energy to the surface in the form of heat via the tip by passing a write current through the cantilever. For this reason, the cantilever comprises a heater element to be heated up. Data are represented by indentation marks or non-indentation marks in the storage medium. For selectively erasing indentation marks, new pits are formed overlapping each other over pre-recorded indentation marks to be erased. In this way, the surface of the storage medium is substantially leveled. This is achieved by performing the write operation, that is by heating up the tip to a level sufficient to locally deform the polymer layer. This write operation is, for the purpose of erasing, performed with a high density of new pits overlapping each other so that each new pit effectively erases the immediately preceding pit. WO 02/061734 further discloses that, in the erase operation, the force being applied from the tip may be reduced or removed altogether. The application of the heating energy excites molecules in the surface of the storage medium and intermolecular forces in the surface of the storage medium are then sufficient to push the tip out as the surface of the storage medium relaxes into its stable state.

SUMMARY OF THE INVENTION

Thus, the present invention provides a data storage device and a method for operating a data storage device. According to one aspect of the present invention, a data storage device is provided comprising a storage medium for storing data in the form of marks, at least one probe, the at least one probe and the storage medium being operable to move relative to each other. Each probe comprises a tip facing the storage medium and has a force creating unit associated thereto. The force creating unit is operable to create a force acting between the tip and the storage medium. The data storage device is operable to erase an indentation mark in the storage medium by way of controlling the force creating unit for creating at least one force pulse with a force rise time being less than or equal to the order of 1 microsecond.

In a further aspect of the present invention, the data storage device is operable to create multiple force pulses for erasing one indentation mark. This has the advantage that the force rise time may be longer and also the force may be lower and, at the same time, a high erase quality may be ensured with less mechanical wear on the tip and the storage medium.

In a further aspect of the present invention, the multiple force pulses for erasing one indentation mark are created with a force pulse frequency greater than 10 kHz. This has the advantage that heat is regenerated at these high frequencies and leads to a sufficient local heating of the storage medium during applying these multiple force pulses since heat diffusion takes place in the time range of the respective periods of these high frequencies. This enables a very high erase quality. In this context, it is further advantageous that said force pulse frequency is above 100 kHz. This enables an extremely high erase quality.

In a further aspect of the present invention, the data storage device is designed for creating an indentation mark by a write force pulse, without the aid of an additional heat source.

In a further aspect of the present invention, there is provided a method for controlling a data storage device comprising: a storage medium for storing data in the form of indentation marks; at least one probe, the at least one probe and the storage medium being operable to move relative to each other, with each probe comprising a tip facing the storage medium and having a force-creating unit associated thereto, the force-creating unit being operable to create a force acting between the tip and the storage medium, the method comprising the step of: erasing an indentation mark in the storage medium by way of controlling the force-creating unit for creating at least one erasing force pulse with a force risetime being less than or equal to the order of 1 microsecond.

BRIEF DESCRIPTION OF THE DRAWINGS

Reference will be made, by way of example, to the accompanying drawings, in which.

Figure 1:
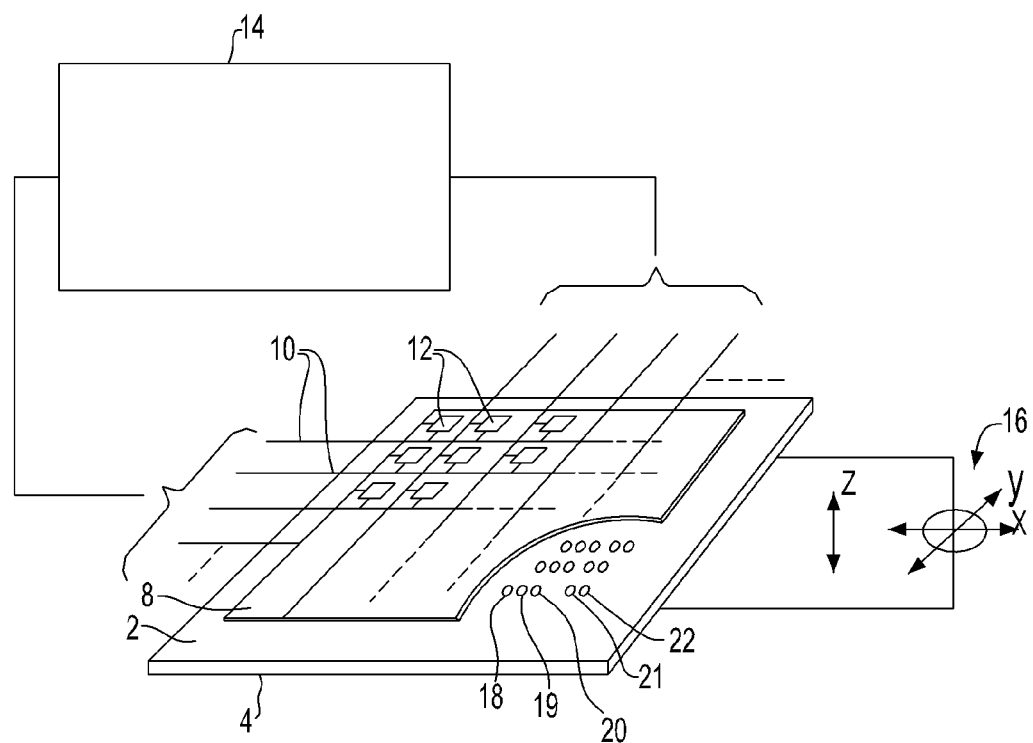
FIG. 1 is a perspective view of a storage device.

REFERENCE NUMERALS 2 storage medium
4 substrate
6 probe
8 frame
10 row-lines
12 column-lines
14 control and information processing unit
16 scanner
x x-direction
y y-direction
18,20,22 indentation marks
26 spring cantilever
28 tip
30 apex
32 capacitive platform
34 further capacitive platform
F force
DF rise in force
tr force rise time
tpd force pulse duration
tpd force pulse period

DETAILED DESCRIPTION OF THE INVENTION

The present invention provides data storage devices, systems and methods for operating a data storage device. In an example embodiment of the present invention, a data storage device is provided comprising a storage medium for storing data in the form of marks, at least one probe, the at least one probe and the storage medium being operable to move relative to each other. Each probe comprises a tip facing the storage medium and has a force creating unit associated thereto. The force creating unit is operable to create a force acting between the tip and the storage medium. The data storage device is operable to erase an indentation mark in the storage medium by way of controlling the force creating unit for creating at least one force pulse with a force rise time being less than or equal to the order of 1 microsecond.

Embodiments of the present invention are generally based on the finding that the short force rise time surprisingly enables a spontaneous relaxation of the indentation mark driven by entropic elasticity forces. During the short force rise time, energy is released in the form of local heat. Thus, by choosing the force rise time appropriately, the storage medium is heated locally and relaxation of a respective indentation mark is enabled. The data storage device may be operated in a highly energy efficient manner and in a way that is more energy efficient than conducting the erasing operation in the previously-proposed way, that is, by the aid of heat created by a heating conductor and being applied via the tip of the probe to the storage medium. Additionally, an embodiment of the present invention enables a higher erasing speed with limitations set only by mechanical properties—in particular a response time—of the probe. Its thermal heat conduction properties are no longer relevant. Furthermore, a data storage device embodying the present invention may also be operated in respect to the erasing operation independently of ambient conditions. Also, tribochemical wear of the tips is very low. Independence from the ambient conditions enables reduction of the overall complexity of the data storage device.

In an advantageous embodiment of the present invention, the force rise time is in the range of 10 to 100 ns. In this range, it has been shown that the erase quality may be very high.

In a further advantageous embodiment of the present invention, the force pulse comprises a rise in the force during the force pulse in the range from 10 nN up to 2 orders above. It has been shown that, in this way, sufficient energy may be provided to efficiently relax the pre-existing indentation marks.

In a further advantageous embodiment, the data storage device is operable to create multiple force pulses for erasing one indentation mark. This has the advantage that the force rise time may be longer and also the force may be lower and, at the same time, a high erase quality may be ensured with less mechanical wear on the tip and the storage medium.

In a further advantageous embodiment, the multiple force pulses for erasing one indentation mark are created with a force pulse frequency greater than 10 kHz. This has the advantage that heat is regenerated at these high frequencies and leads to a sufficient local heating of the storage medium during applying these multiple force pulses since heat diffusion takes place in the time range of the respective periods of these high frequencies. This enables a very high erase quality. In this context, it is further preferred that said force pulse frequency is above 100 kHz. This enables an extremely high erase quality.

In a further advantageous embodiment, the force pulse frequency is chosen in the range of a resonance frequency of the probe. This enables an extremely energy-efficient control of the erase procedure.

In a further advantageous embodiment, the data storage device is designed for creating an indentation mark by a write force pulse, without the aid of an additional heat source. This enables to speed up the process for creating consecutive indentation marks as the thermal properties of the probe do not play a relevant role anymore. Furthermore, the complexity of the data storage device may be reduced as the force creation is independent from ambient temperatures. Also, the choice for the data storage medium, in particular a polymer layer, is then no longer restricted by a number of requirements needing to be fulfilled simultaneously, that is thermal stability, softening temperature, homogeneity, hardness, wear, etc. Additionally, the tribochemical wear of the tips is then also reduced. Furthermore, the writing or the creation of indentation marks may then be achieved with a very high energy efficiency.

A corresponding method aspect of the invention is also provided. Thus, there is also provided a method for controlling a data storage device comprising: a storage medium for storing data in the form of indentation marks; at least one probe, the at least one probe and the storage medium being operable to move relative to each other, with each probe comprising a tip facing the storage medium and having a force-creating unit associated thereto, the force-creating unit being operable to create a force acting between the tip and the storage medium, the method comprising the step of: erasing an indentation mark in the storage medium by way of controlling the force-creating unit for creating at least one erasing force pulse with a force risetime being less than or equal to the order of 1 microsecond.

FIG. 1 shows a perspective view of a data storage device that is used for storing data. Preferably, a storage medium 2 is formed by a thin polymer layer. The polymer layer may e.g. be formed of a thin polymethylmethacrylate (PMMA) layer. The storage medium may, however, also be some other suitable material, for example, any suitable polymer media. The storage medium 2 is supported by a substrate 4. The substrate 4 is preferably formed of silicon.

An array of probes is mounted on a common frame 8, of which only a few probes are shown in FIG. 1. As can be appreciated, the data storage device may comprise a large number of probes, such as 1024 or even more, or only just one probe. Each probe comprises terminals which are electrically connected to a control and information processing unit 14 via electrically conductive lines. In order to reduce the complexity of the wirings, it is preferred to connect the terminals via row-lines 10 and column-lines 12 and possibly via multiplexers (not shown) to the control and information processing unit 14. The control and information processing unit 14 is designed for controlling the data storage device and is explained in further detail below. The control and information processing unit 14 is designed for controlling a movement of the storage medium 2 and the substrate 4 relative to the frame 8 in an x- and y-direction. The actuation for this is accomplished by a scanner 16, a relative movement in a z-direction is accomplished by applying respective electrostatic forces on the probes as described in detail below.

In the storage medium 2, indentation marks 18 to 22 are present, which represent a logical information. Advantageously, an indentation mark represents a logical "1", whereas the absence of the indentation mark may represent a logical "0". The indentation marks 18 to 22 are of a nanoscale diameter. They may, for example, have a diameter ranging from 10 to 50 nm. In FIG. 1, only a few marks 18 to 22 are shown, which also do not represent their real physical properties. The few indentation marks 18 to 22 are just shown by way of example.

Figure 2:
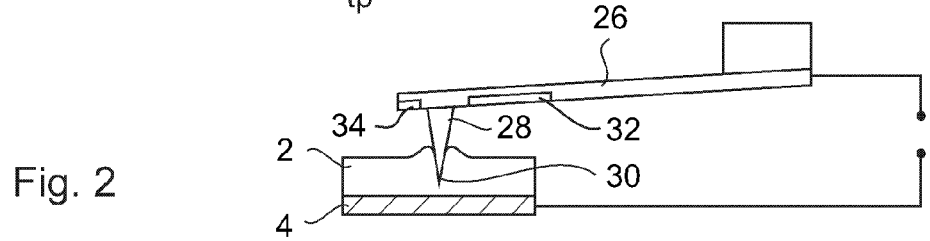
FIG. 2 is a cross-sectional view of part of the storage device according to FIG. 1.

In FIG. 2, a cross-sectional view of part of the data storage device according to FIG. 1 is shown. A probe is shown which comprises a spring cantilever 26, on which a tip 28 is mounted having a apex 30 having a radius in the low nanometer range. The indentation marks 18 to 22 are formed by pushing the apex 30 of the tip into the storage medium 2 in an appropriate way. Advantageously, the apex 30 has a diameter in the range of a few nanometers.

The probe comprises a capacitive platform 32. A first electrode is formed by the capacitive platform 32. A second electrode is advantageously formed in the substrate 4. The first and second electrodes together with the medium in-between them form a capacitor and form, together with respective control circuitry in the control and information processing unit 14, a force creating unit. The substrate may, for example, be fabricated from silicon and, at least in a given area, be respectively doped in order to provide a low electrical resistance and to form, in that way, the second electrode. The second electrode may, however, also be formed in a separate layer between the storage medium 2 and the substrate 4. The spring cantilever 26 may be formed in a way that the apex 30 of the tip 28 is in permanent contact with the storage medium 2. It may, however, also be formed in combination with the tip 28 in a way that, without applying external forces, the apex 30 is located at a given distance from the storage medium 2. In this case, the formation of indentation marks 18 to 22 and also the detection or the erasure is accomplished in a so-called intermittent mode, in which the apex 30 is pushed into respective indentation marks 18 to 22 by the application of external forces.

The z-position of the apex 30 of the tip 28 is controlled by varying the voltage potential on the first electrode provided from the control and information processing unit 14. In addition to that, the force with which the tip 28 is pressed onto the storage medium 2 may be adjusted by further varying the voltage potential of the first electrode. This may be achieved by an open or closed loop control, preferably a closed loop control. The formation of indentation marks 18 to 22 is achieved by creating a write force pulse. This force pulse is created by varying the voltage potential of the first electrode, respectively. Variation of the voltage potential is controlled in a way that a rise time tr of the force pulse is very low, being less than or equal to the order of 1 microsecond. In combination with a suitably chosen rise DF in the force F, an indentation mark may be in that way created using the effect that the short rise time tr of the force pulse leads to an adiabatic heating of the material surrounding the apex of the tip of the storage medium 2. This local creation of heat then enables the local deformation of the substrate without a high mechanical wear of the tip 28. When the tip 28 is subsequently moved out of the storage medium, the indentation mark rests, being in a meta-stable state. In that way, the write mode for creating indentation marks may be performed without the aid of an additional heating element being formed in the probe as is the case in previously-proposed techniques. However, this additional heating element may also be comprised in the probe and in this case, the write mode may also be accomplished by heating up the tip by the aid of this additional heating element and applying a respective force acting between the storage medium and the tip. In this case, a pre-tensioning force being possibly exerted by the spring cantilever may be sufficient.

The probe may be provided with a further capacitive platform 34, which forms a third electrode. The third electrode together with the first electrode may then form a further capacitor being designed for providing a read-back signal. During a read mode of the storage device, the probe scans over its assigned field of the storage medium 2. The voltage potential on the first electrode may, during the read mode, be set such that the apex 30 of the tip 28 continuously moves in very close contact to the surface of the storage medium 2 across the storage medium 2. Advantageously, the voltage potential on the first electrode is then set such that the tip 28 with its apex 30 is pressed with a given force onto the storage medium 2. When the tip 28 is then scanned over an indentation mark 18 to 22, it is pushed into the indentation. This results in a change in the distance between the third electrode formed by the further capacitive platform 34 and, thus a change in capacitance of the further capacitor. This change in capacitance is then measured, for example, by measuring the change of the voltage potential on the third electrode and this measurement signal is used as a read-back signal for detecting an indentation mark 18 to 22. If the probe is designed for detecting, during the read mode, indentation marks by a change in capacitance, the read mode may be accomplished with low power consumption and the speed of reading is not limited by a thermal time constant of the tip.

The capacitive platform may, instead of being continuously supplied with the respective voltage potential leading to a given force pressing the apex 30 of the tip onto the storage medium, be only supplied with read voltage pulses synchronized with read events, that is, only when it moves closely to a location on the storage medium 2, where an indentation mark 18 to 22 could possibly be present. This reduces the friction that the tip 28 is subjected to.

In an alternative embodiment, the probe may instead of the further capacitive platform 34 be provided with a heating element, preferably a heating resistor. During the read mode, in timely synchronization of an expected movement of the tip 28 into the indentation mark 18 to 22, a respective voltage pulse is applied to the read element, which results in heating up the read resistor. When the tip moves into the indentation mark 18 to 22, the distance between the read element and the storage medium 2 and the substrate 4 decreases. This results in a change of the heat dissipation from the heating element and can be sensed in the control and information processing unit 14.

Figure 3:
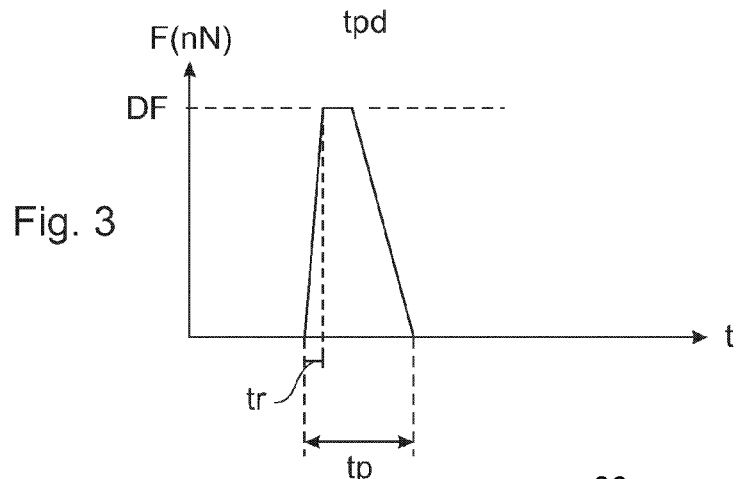
FIG. 3 is a first force diagram.

The control and information processing unit 14 is furthermore designed for operating the data storage device in an erase mode in which indentation marks 18 to 22 may be selectively erased. In a first embodiment of the erase mode, the tip 28 is placed in proximity to the indentation mark 18 to 22 to be erased. It may, for example, be placed at a distance of 20 nm away from the center of the respective indentation mark 18 to 22. It may, however, also be placed closer or further away from the respective center of the respective indentation mark 18 to 22. It may also eventually be placed in the center of the indentation mark in respect to the x-y-direction. An erase force pulse for erasing the respective indentation mark 18 to 22 is then created, which is shown by way of example in the force-time diagram of FIG. 3. The erase force pulse is controlled by the control and information processing unit 14 by applying a given course of the voltage potential on the first electrode. For this purpose, the control and information processing unit 14 is provided with a respective or multiple respective units for creating this course of the voltage potential.

The erase force pulse is controlled in a way that a force rise time tr is extremely short. The force rise time tr should be less than or equal to the order of 1 microsecond. More preferably, the force rise time tr is in the range of 10 to 100 ns. During the force rise time tr, the voltage potential on the first electrode is changed, which results in a rise DF in force F. This rise DF in the force F is suitably chosen. Advantageously, the rise DF in the force F during the erase force pulse is in the range from 10 nN up to two orders above. The force is then maintained and after that reduced again to its previous level. This results in a force pulse duration tp shown in FIG. 3. The short rise time tr in particular together with the suitably chosen rise DF in force F results in energy being delivered to the storage medium locally in the area of the respective indentation mark 18 to 22 to be erased such that a spontaneous relaxation of the indentation mark 18 to 22 occurs driven by entropic elasticity forces. It is assumed that the energy is mainly in the form of heat, heating the storage medium 2 locally above the glass transition temperature and enabling, in this way, the spontaneous relaxation of the indentation mark 18 to 22.

In a further embodiment of the erase mode, multiple force pulses are created for erasing one indentation mark 18 to 22. In this way, also multiple indentation marks 18 to 22 may be erased very efficiently.

The force pulses are created with a high frequency that is a force pulse frequency above 10 kHz. Advantageously, the force pulse frequency ranges in the range from 10 kHz to 1 MHz. The pulse frequency mainly depends on the thermal heat conduction properties of the storage medium 2 and the rise DF in force during each force pulse and the force rise time tr. The lower the rise DF in force is and/or the longer the force rise time tr, the higher the force pulse frequency should be chosen in order to ensure a sufficient energy transfer locally to the storage medium 2 in order to enable the spontaneous relaxation of the indentation mark 18 to 22 driven by entropic elasticity forces. Very good results have been achieved by choosing the force pulse frequency above 100 kHz. In particular, it is advantageous, if the force pulse frequency is chosen in the range of the resonance frequency of the probe.

Figure 4:
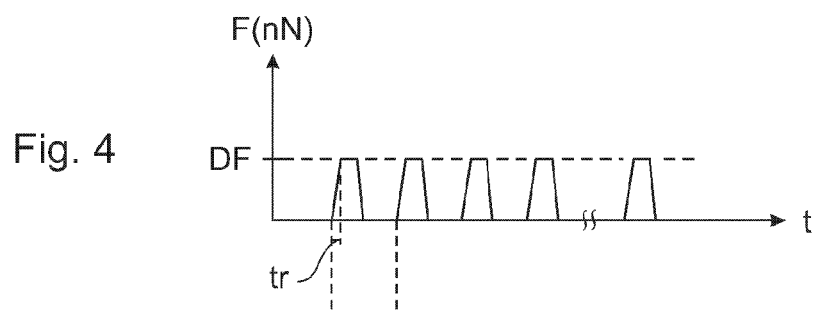
FIG. 4 is a second force diagram.

The tip 28 may be placed in close proximity to the indentation mark 18 to 22 while controlling the erase force pulses with the given force pulse frequency. However, the tip 28 may also be placed in the respective indentation mark 18 to 22 to be erased. In particular, if various consecutive indentation marks 18 to 22 are to be erased, the probe may also be continuously scanned across the storage medium 2 in the respective area where the indentation marks 18 to 22, which should be erased, are located and simultaneously, the respective force pulses are created with the force pulse frequency. In FIG. 4, such multiple force pulses are shown and the force pulse frequency is represented by the force pulse period tpd.

Figure 5:
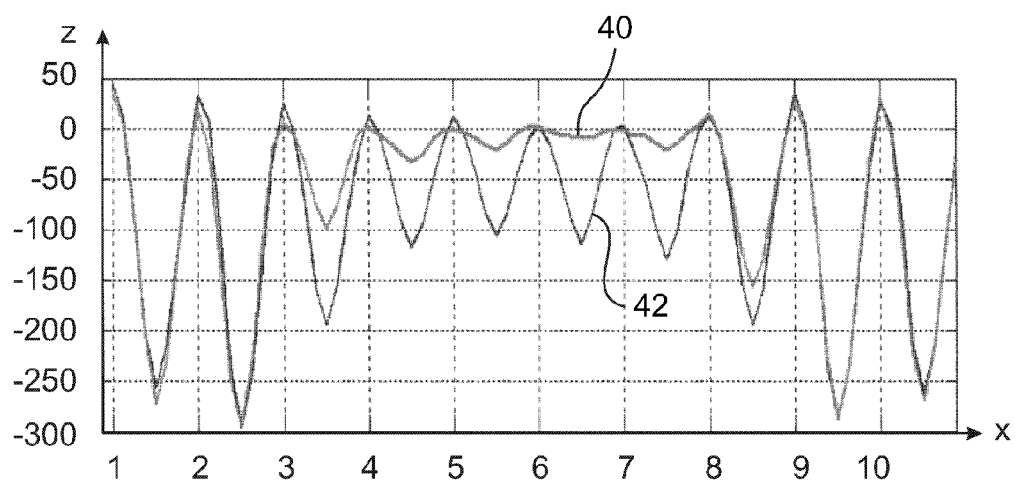
FIG. 5 shows various profiles of a storage medium.

FIG. 5 shows a measured topography of part of the storage medium 2. The respective x- and z-directions are plotted against each other. Curve 42 is obtained by operating the storage device in parts of the x-area shown in the first embodiment of the erase mode, where one force pulse is applied for erasing one indentation mark 18 to 22. Curve 40 represents the results for erasing respective indentation marks 18 to 22 when the storage device is operated in the second embodiment of the erase mode. The indentation marks to be erased are located in the range from 3 to 8. In the range from 1 to 3 and 9 to 10, respective indentation marks were not erased. One can see that, by the first embodiment of the erase mode, the indentation marks to be erased are fairly well erased and may be detected as erased indentation marks by comparing the measured topography with a suitably chosen threshold. However, by applying the erase mode of the second embodiment, the surface becomes visibly more leveled and in this way, this results in a higher quality of erasing the respective indentation marks 18 to 22.

The force rise time tr is generally only limited by the mechanical response time of the probe, in particular of the spring cantilever 26. For that reason, the force rise time may be chosen as low as the mechanical response time of the respective probe permits.

It will be understood that the present invention has been described above purely by way of example and modifications of detail can be made within the scope of the invention. Each feature disclosed in the description, and (where appropriate) the claims and drawings may be provided independently or in any appropriate combination.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

It is noted that the foregoing has outlined some of the more pertinent objects and embodiments of the present invention.

This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method for controlling a data storage device comprising a storage medium for storing data in the form of indentation marks; at least one probe, said at least one probe and said storage medium being operable to move relative to each other, with each probe comprising a tip facing the storage medium and having a force creating unit associated thereto, said force creating unit being operable to create a force acting between said tip and said storage medium, said method comprising:
    erasing an indentation mark in said storage medium by way of controlling said force creating unit for creating at least one erase force pulse with a force rise time being less than or equal to the order of 1 µs, wherein said erase force pulse comprises a rise in said force during said erase force pulse in the range from 10 nN up to two orders above;
    creating multiple erase force pulses for erasing one indentation mark including creating erase force pulses for erasing one indentation mark with a force pulse frequency of at least 10 kHz; and
    creating an indentation mark by a write force pulse without the aid of an additional heat source.

* * * * *